Patented May 18, 1943

2,319,389

UNITED STATES PATENT OFFICE 2,319,389

COATING COMPOSITION

Frank W. Corkery, Crafton, and Samuel G. Burroughs, Pittsburgh, Pa., assignors to Pennsylvania Industrial Chemical Corporation, a corporation of Pennsylvania No Drawing. Application July 16, 1940, Serial No. 345,860

5 Claims. (Cl. 260—28)

This invention relates to a thermoplastic coating composition purposed particularly as a coating for paper and other fibrous or cellulosic materials, such as cloth of different sorts.

Heretofore the substances preponderantly used for coating paper have been paraffin wax and coating compositions containing paraffin wax and one or more of the more expensive types of resin, such as coating compositions containing vinyl resins or the polymers of acrylic acid esters.

Paraffin wax is the typical paper coating material, but of itself does not give to a maximum all the desired qualities of a paper coating, in that it tends to opacity is of relatively low-melting point and has low resistance to abrasion. It also has poor heat-sealing properties. Paraffin wax being a mixture of the higher series of aliphatic hydrocarbons has very poor compatibility with many other substances which would tend to modify its qualities for the better, since it is an even poorer solvent for most resins, and the like potential modifying substances than are the evaporative aliphatic hydrocarbon solvents of relatively low solvent power. It is possible by hydrogenation to make certain resins, inherently incompatible with paraffin, compatible with it.

We have discovered that the resins produced by polymerization of selected unsaturated carbocyclic terpadienes are, without hydrogenation or other treatment, highly compatible with paraffin wax to such extent that they blend in all proportions with the wax without granulation in the mixture or separation between the wax and resin. Thus, we have discovered that we are able successfully to blend with paraffin wax the highest melting terpene resins which may be made by polymerizing selected unsaturated constituents of gum spirits of turpentine and other terpene starting materials; such as those high polymers of beta-pinene, and terpene mixtures in which beta-pinene preponderates, which are disclosed in the application of Samuel G. Burroughs, Serial No. 288,390 filed August 4, 1939. We have found that by so doing, we are able to produce with paraffin wax a homogeneous mixture having a melting point much higher than that of the paraffin wax, and yet which possesses wax characteristics. Such a blend of terpene resin and paraffin waxes, in accordance with the proportional inclusion of the resin and its melting point, has a greater resistance to abrasion than paraffin wax, and has better heat-sealing properties than the wax taken by itself. If a terpene resin mixed with the wax is of sufficiently high melting point and is included in the composition in sufficiently great proportion, we have also discovered that paper coated with the mixture is translucent and in practical effect transparent, and that it possesses a glossy finish, so that the coated paper is suitable for use in display packages for foods and other materials.

The proportions in which terpene resins, even those of the highest melting point which have been made, are compatible with paraffin wax are unlimited, so that there may be included in the wax mixture any relative proportions which are desirable or economical in making a composition for use in making any specialized type of coated paper or fabric. In this connection it should be emphasized that the terpene resins require no addition or modification in order that they may possess such broad measure of compatibility with the paraffin wax.

In line with the foregoing, we may make a paper-coating composition containing, for example, 90% paraffin wax, and 10% of high-melting terpene resin. Such composition has good heat-sealing properties, in which the paraffin wax is of itself deficient, and has a higher gloss and lesser opacity than paraffin wax. We have found that even this relatively small proportional inclusion of terpene resin, and this is particularly true if the resin has a high melting point such as a melting point of from 250° F. upward, gives a coating composition which, when applied, has better film continuity and better resistance to abrasion than unmodified paraffin wax.

As exemplary of coating compositions capable of rendering paper transparent and giving it a glossy finish, so that it is well suited for the packaging of foods and the like, we may mix paraffin wax and high-melting terpene resin, such as a terpene resin melting about 275° F., in a proportion of from 30% and more of the resin.

A coating composition in which the brittleness of the resin is modified by an addition of wax may be made by mixing the resin with 25% or even less of paraffin wax. Such composition is useful for glazing paper for purposes in which great transparency or translucency is of primary importance.

In all mixtures of the wax and resin the qualities imparted to the mixture by the resin are more striking for any proportional inclusion of the resin, the higher the melting point of the resin which is included.

In addition to paraffin wax, all the other wax-like materials, whether or no they be wholly hydrocarbon in nature, are compatible with terpene resin of all melting points. Thus, for example, in our thermoplastic coating composition we have made homogeneous mixtures of terpene resin having melting points up to the highest currently obtainable with ceresin wax, candelilla wax, carnauba wax, montan wax, japan wax; and synthetic waxes, such as those produced by the esterification of long chain alcohols with fatty acids, and hydrogenated fats and oils. Most of the other wax-like materials lack the chemical resistance of paraffin wax, but otherwise have properties making them useful in a thermoplastic coating composition of the sort with which we are concerned.

Among the wax-like materials which we may use, paraffin wax may be considered the preferred waxy ingredient, both for reasons of economy, and because its other properties, such as light color, chemical resistance, and relatively high melting point render it suitable. It is the wax typically used for paper coating, and in known thermoplastic coating compositions for paper coating and like uses. The usual high grade of paraffin wax obtained from petroleum oils melts at about 140° F. Certain other wax-like materials, typically carnauba wax, melt at relatively high temperatures.

In our coating composition it is important that the terpene resin be higher melting than the wax-like material with which it is mixed, in order that the more substantial advantages coming from its inclusion may be had. This is true with whatever one, or more of the wax-like materials it may be mixed. It follows that, in order to obtain compositions having properties best suited to particular materials to be coated, and particular uses to which the materials thus coated are to be put, we vary the melting point of the terpene resin and its proportional inclusion in accordance with the melting temperature of the wax-like material for any intended use of the composition. It is roughly true that inclusion of the terpene resin in any proportion with a wax-like material proportionally modifies the properties of that material, and inclusion of a wax-like material in any proportion with a terpene resin proportionally modifies the properties of the resin.

Because of the compatibility of the highest melting terpene resin with all wax-like materials, and because there is nothing critical about the proportional inclusion of the ingredients of the composition, it is a simple matter to apportion the ingredients of the composition in accordance with their melting properties and the intended use of the composition. Thus, we may give, as roughly illustrative, a coating composition for a coated paper of good heat-sealing properties consisting essentially of about 90% paraffin wax melting at about 140° F. and about 10% of terpene resin melting at about 300° F. As a composition for glazed paper for use in display packages and the like, we may give as roughly exemplary a composition consisting essentially of about 40% paraffin wax melting at about 140° F. and about 60% of terpene resin melting at about 250° F. For a composition having primarily the properties of a plasticized resin, we may give as roughly exemplary one consisting essentially of about 25% paraffin wax melting at about 140° F. and about 75% of terpene resin melting at about 275° F. It is a simple matter to obtain varied desired properties of the coating composition by varying the proportions of the ingredients and by selecting the ingredients on the basis of their melting temperatures. By reference to the melting temperatures of all the various other wax-like materials, it is also a simple matter to make up from the other wax-like materials and terpene resin coating compositions which parallel the paraffin-wax compositions in the properties dependent upon the melting characteristics of the ingredients.

All variants of the terpene-containing coating composition above described are thermoplastic compositions, and by this we mean that in applying them they are caused to flow by heat. They thus may be prepared for application, and may be applied by any procedure known to be suitable for the application of coatings of paraffin-wax and other wax-like materials, or coating compositions consisting essentially of such materials and ingredients other than terpene resins. The mixture of the ingredients is made by fusing them together, and may be applied either as made or by refusing the mixture. In either case the melting temperature of the resin is lowered by its intimate association with the wax-like material, or materials with which it is mixed. It may be applied to paper or fabric in any of the well-known methods by which they have been coated; as by immersion, hot-spraying, use of the doctor knife, or working in hot rolls. It may be applied to the surfaces of more substantial bodies, in any way known to be suitable for applying thermoplastic coatings; as by immersion or hot-spraying.

Our coating composition, consisting essentially of an unaltered and relatively inexpensive terpene resin and a wax-like material, which may be the relatively inexpensive paraffin wax, thus has commercial advantage over coating compositions of similar sort which include with the wax modifying ingredients of some more expensive type. It has, in comparison with the wax alone, greater resistance to abrasion, better heat-sealing properties due to the interent tendency of the resin to act as a thermoplastic adhesive, gloss and transparency in higher order, and the ability to improve the capacity of paper coated with it to receive a suitable printing ink without blurring or spreading.

Other advantageous qualities of our coating composition are attributable to the wholly hydrocarbon nature of its terpene resin content. For example, that resin tends to impart to the coating composition its own inherent qualities of chemical resistance to acids, alkalis, salts, and other reagents. It also tends to impart to the coating composition in which it is included resistance to enzyme reactions, and thus to render paper or fabric coated with it suitable for use in packaging foods. If, as is usual, we include the terpene resin with paraffin wax, which is also wholly hydrocarbon in nature, the coating composition possesses those qualities in maximum order.

To our base coating composition, consisting essentially of a wax-like material and a higher-melting terpene resin, other ingredients for imparting specific additional qualities may be added. Thus, a number of high molecular weight strength-increasing substances are compatible both with the paraffin wax, or other wax-like material, and with the terpene resin. For example, we may add to the composition a minor proportion of strength-increasing substances, such as the polymers of isobutylene, the lower polymerized forms of the higher esters of acrylic acid, such as butyl-methacrylate, worked rubber, the resin content of rubber, and rubber derivatives exemplified by chlorinated rubber; making such addition to the essential composition when highly elastic coatings are desired.

Additions, such as those above noted, may be made to our essential composition without departure from our invention, and while remaining within the definition of that invention as contained in our appended claims.

We claim as our invention:

1. The herein-disclosed thermoplastic coating composition consisting essentially of a homogeneous mixture of paraffin wax and thermoplastic resin melting higher than the paraffin wax and composed of polymers of unsaturated carbocyclic terpadienes.

2. The herein disclosed thermoplastic coating composition having as its major component a homogeneous mixture of a wax and thermoplastic resin melting higher than the wax and composed of polymers of unsaturated carbocyclic terpadienes in the approximate proportion of 10% to 75% of the terpene polymers and 25% to 90% of the wax.

3. The herein disclosed thermoplastic coating composition consisting of a homogeneous mixture of paraffin wax and thermoplastic resin melting higher than the paraffin wax and composed of polymers of unsaturated carbocyclic terpadienes in the approximate proportion of 10% to 75% of the terpene polymers and 25% to 90% of the wax.

4. The herein-disclosed thermoplastic coating composition consisting essentially of a homogeneous mixture of a wax and thermoplastic resin melting higher than the wax and composed of polymers of unsaturated carbocyclic terpadienes.

5. The herein-disclosed thermoplastic coating composition having as its major component a homogeneous mixture of a wax and thermoplastic resin melting higher than the wax and composed of polymers of unsaturated carbocyclic terpadienes.

FRANK W. CORKERY.
SAMUEL G. BURROUGHS.